United States Patent

Lauzon

[11] Patent Number: 5,846,308
[45] Date of Patent: Dec. 8, 1998

[54] EMULSIFIER SYSTEM FOR ROSIN SIZING AGENTS

[75] Inventor: Rodrigue V. Lauzon, Hockessin, Del.

[73] Assignee: Hercules Incorporated, Wilmington, Del.

[21] Appl. No.: 46,019

[22] Filed: Mar. 18, 1998

Related U.S. Application Data

[63] Continuation of Ser. No. 594,612, Feb. 2, 1996, abandoned.

[51] Int. Cl.$^6$ .................. C09D 193/04; D21H 17/62; D21H 17/71; B01F 17/50
[52] U.S. Cl. .................. 106/218; 106/238; 162/180; 252/355
[58] Field of Search ................... 106/218, 238; 162/180; 252/355

[56] References Cited

U.S. PATENT DOCUMENTS

| | | |
|---|---|---|
| 2,628,918 | 2/1953 | Wilson et al. . |
| 2,684,300 | 7/1954 | Wilson et al. . |
| 3,046,186 | 7/1962 | Arlt, Jr. . |
| 3,565,755 | 2/1971 | Davison . |
| 3,582,464 | 6/1971 | Aldrich . |
| 3,677,888 | 7/1972 | Economou . |
| 3,775,172 | 11/1973 | Clark . |
| 3,790,514 | 2/1974 | Economou . |
| 4,002,588 | 1/1977 | Strazdins . |
| 4,005,250 | 1/1977 | Greiner . |
| 4,199,369 | 4/1980 | Hughes et al. . |
| 4,203,776 | 5/1980 | Greiner . |
| 4,240,935 | 12/1980 | Dumas . |
| 4,263,182 | 4/1981 | Aldrich . |
| 4,374,673 | 2/1983 | Aldrich . |
| 4,522,686 | 6/1985 | Dumas . |
| 4,540,635 | 9/1985 | Ronge et al. . |
| 4,657,946 | 4/1987 | Rende et al. . |
| 4,861,376 | 8/1989 | Edwards et al. . |
| 5,201,944 | 4/1993 | Nakata et al. . |
| 5,318,669 | 6/1994 | Dasgupta . |
| 5,338,406 | 8/1994 | Smith . |
| 5,338,407 | 8/1994 | Dasgupta . |
| 5,393,337 | 2/1995 | Nakamura et al. . |
| 5,438,087 | 8/1995 | Ikeda et al. .............................. 524/272 |

FOREIGN PATENT DOCUMENTS

| | | |
|---|---|---|
| 0 235 893 A | 9/1987 | European Pat. Off. . |
| 0 537 682 A | 4/1993 | European Pat. Off. . |
| 1 589 054 A | 3/1970 | France . |
| 44 12 136 A | 10/1995 | Germany . |
| 1694484 A | 11/1991 | U.S.S.R. . |
| 1 505 641 | 3/1978 | United Kingdom . |
| 2 141 751 A | 1/1985 | United Kingdom . |

OTHER PUBLICATIONS

J.C. Roberts, "The Chemistry of Paper,"*Royal Society of Chemistry*, Cambridge XP002032491, p. 91, Figure 6.2 (1996), no month avail; and.

*Primary Examiner*—David Brunsman
*Attorney, Agent, or Firm*—Mark D. Kuller

[57] ABSTRACT

A dispersed rosin sizing composition comprising rosin stabilized by a cationic colloidal coacervate dispersing agent, the coacervate dispersing agent comprising an anionic component and a cationic component, the anionic and cationic components being present in a proportion such that the sizing composition has a zeta potential of at least about 20 millivolts. Methods of making and using the stable rosin sizing composition are also disclosed, as is sized paper made using the sizing composition.

57 Claims, 1 Drawing Sheet

5,846,308

EMULSIFIER SYSTEM FOR ROSIN SIZING AGENTS

CROSS-REFERENCE TO RELATED APPLICATION

This application is a continuation of U.S. patent application 08/594,612, filed Feb. 2, 1996 now abandoned.

FIELD OF THE INVENTION

This invention relates to the emulsification and colloidal stabilization of rosin sizing agents, and is directed to a stable rosin sizing composition or dispersion, a method of making the stable sizing dispersion, a method of using the sizing composition to produce sized paper, and sized paper, including paperboard, sized with the sizing composition.

BACKGROUND OF THE INVENTION

While there are a myriad of details for manufacturing paper, the paper manufacturing process conventionally comprises the following steps: (1) forming an aqueous suspension of cellulosic fibers, commonly known as pulp; (2) adding various processing and paper enhancing materials, such as strengthening and/or sizing materials; (3) sheeting and drying the fibers to form a desired cellulosic web; and (4) post-treating the web to provide various desired characteristics to the resulting paper, including surface application of sizing materials, and the like.

Sizing materials are typically in the form of aqueous solutions, dispersions, emulsions or suspensions which render the paper treated with the sizing agent, namely sized paper, resistant to the penetration or wetting by an aqueous liquid, including other treatment additives, printing inks, and the like.

Sizing agents are internal additives employed during papermaking or external, surface additives employed at the size press that provide the enhanced characteristics. There are two basic categories of sizing agents: acid and alkaline. Acid sizing agents are intended for use in acid papermaking systems, traditionally less than about pH 6. Analogously, alkaline sizing agents are intended for use in alkaline papermaking systems.

Most acid sizing agents are based on rosin. The development of sizing with a rosin-based size is dependent upon its reaction with compounds capable of forming an aluminum rosinate, typically papermaker's alum, aluminum sulfate, $Al_2(SO_4)_3$, with various amounts of water of hydration. Other similar equivalent well-known aluminum compounds, such as aluminum chloride, aluminum chlorohydrate, polyaluminum chlorides, and mixtures thereof, may also be used. Rosin and alum or its equivalents complex either in the wet end of the papermaking system or during elevated temperature drying to form aluminum rosinate, which renders the paper hydrophobic. Since aluminum species that exist predominantly at a low pH (about <pH 6) are required for the appropriate interactions needed to effect sizing, rosin and alum have been used primarily in acid papermaking systems. It has been shown that, by proper selection of addition points in the papermaking system and by using cationic dispersed rosin sizes, rosin-based sizes can be used in papermaking systems up to about pH 7, thus extending the range of acid sizes. However, due to the limitations imposed by alum chemistry, the efficiency of rosin-based sizes decreases above about pH 5.5.

Certain properties of sizing agents are important to control for their efficient and economical use in making paper. One important property is sizing efficiency, i.e., the degree of sizing obtained per unit of sizing agent added. Sizing efficiency is determined by the amount and cost of materials used in making the sizing agent to obtain a desired sizing characteristic or group of characteristics. A more efficient sizing agent results in the desired characteristics at a lower amount or a greater efficiency, and thus, improved papermaking economies. Excess sizing agent can result in significant decreases in the paper quality by creating deposits on the papermaking machine, causing defects in the paper. Such deposits also reduce the production rate.

Sizing characteristics are affected by the type of sizing agent used, the type of paper to which the sizing agent is applied, and many other factors which have been the subject of a great deal of work in the past and a continuing body of work presently by those in the paper treatment industry. The present invention relates to sizing agent compositions in the form of emulsions or dispersions, cationic colloidal coacervate dispersion compositions for rosin sizing agents, as well as methods of making and using the resulting compositions and dispersions. The term "emulsion" (liquid in liquid) is sometimes used in the papermaking industry to refer to what is technically a "dispersion" (solid in liquid).

Most sizing dispersions are made by a process involving forming an emulsion of a hydrophobic sizing agent in an aqueous medium at a temperature at which the sizing agent is in a liquid form. Upon cooling to ambient temperature the emulsion droplets solidify and a sizing dispersion results. The process needs an emulsifier and a stabilizer in order to process well. Upon application to the wet end of the papermaking process, the particles of the sizing agent, along with alum or its equivalent as described above adsorb onto the cellulose fiber. Thermal drying causes the rosin particles to melt, distribute along the fiber, and react with the alum or its equivalent. The fiber then becomes less wetting, i.e., sized.

Polymers have been used in the past to help with the emulsification and also to promote interaction of the sizing particles with cellulose fiber suspensions. Starches and water soluble polymers such as polyamidoamines have been used in this context.

Various sizing compositions comprising sizing agents and dispersion aids have been previously disclosed.

U.S. Pat. No. 4,240,935 (Dumas), the disclosure of which is incorporated herein by reference, discloses a paper sizing composition comprising a ketene dimer, an anionic dispersing agent such as sodium lignin sulfonate, certain water-soluble cationic resins and water. The cationic resins are composed of the reaction products of epichlorohydrin and an aminopolyamide derived from a dicarboxylic acid and a polyalkylene polyamine having two primary amino groups and at least one secondary or tertiary amine group. Another group of cationic resins is the reaction product of epichlorohydrin and the condensates of cyanamides or dicyandiamide with a polyalkylene polyamine having a given formula including such compounds as polyethylene polyamines, polypropylene polyamines and polybutylene polyamines.

U.S. Pat. No. 4,263,182 (Aldrich) and U.S. Pat. No. 4,374,673 (Aldrich), the disclosures of which are incorporated herein by reference, both disclose aqueous paper sizing compositions in the form of dispersions consisting essentially of finely divided fortified rosin particles, a water-soluble or water-dispersible cationic starch dispersing agent for the rosin particles, an anionic surface-active agent and water. The distinguishing characteristics between the patents include the use of different types of starches. The '182 patent discloses using cationized starches which are anionic starches modified by reaction with one of five groups of cationizing resin, or a starch modified by reaction with a water-soluble polyamine resin containing epoxy groups. The '673 patent uses cationic starches made by reacting starch with compounds containing both amine groups and groups reactive with hydroxyl groups of the starch, where the reaction involves formation of covalent bonds. Various emulsification and dispersion-forming steps are disclosed involving the particular cationic starch dispersing agents.

U.S. Pat. No. 4,657,946 (Rende et al.), the disclosure of which is incorporated herein by reference, discloses paper sizing compositions comprising alkenyl succinic anhydride sizing agents in an emulsion including cationic water-soluble vinyl addition polymers and surfactants which may be anionic, non-ionic or cationic where one of the cationic emulsifiers can be poly(diallyldimethylammonium chloride).

U.S. Pat. No. 4,861,376 (Edwards et al.), the disclosure of which is incorporated herein by reference, discloses stable, high solids dispersions of ketene dimer using water-soluble carboxylic acid with cationic starch, sodium lignin sulfonate and aluminum sulfate. In some instances, commercial embodiments include the post addition of poly (diallyldimethylammonium chloride), as a promoter, rather than in the emulsification system.

U.S. Pat. Nos. 5,318,669 (Dasgupta) and 5,338,407 (Dasgupta), the disclosures of which are incorporated herein by reference, disclose a process and composition for enhancing the dry strength of paper without substantially reducing the paper's softness. Added to a bleached pulp furnish, separately or together, are an anionic polymer and a cationic polymer. The anionic polymer may be various guar materials and carboxymethyl bean gum. The cationic polymer may be other types of cationic guar and bean gums, cationic acrylamide copolymers and resins based on reactions of various polymers with epichlorohydrin.

U.S. Pat. No. 5,338,406 (Smith), the disclosure of which is incorporated herein by reference, discloses a composition and method for enhancing the dry strength of paper made from pulp of unbleached fibers, and especially those containing black liquor. The composition comprises a polyelectrolyte complex comprising at least one water-soluble, linear, high molecular weight, low charge density cationic polymer having an indicated reduced specific viscosity and charge density, and at least one water-soluble, anionic polymer having a charge density less than 5 meq/g. The cationic polymer may include synthetic polymers such as copolymers of acrylamide, including copolymers of acrylamide with diallyldimethylammonium chloride. Anionic components may include those normally present in unbleached pulps, such as solubilized lignins and hemicelluloses, synthetic anionic polymers and anionically modified natural polymers. Sodium lignin sulfonate is mentioned as an example of an effective anion.

U.S. Pat. No. 5,393,337 (Nakamura et al.), the disclosure of which is incorporated herein by reference, discloses a rosin emulsion sizing agent for papermaking comprising a fortified or unfortified rosin-epoxy compound obtained by reacting a rosin and an epoxy compound. The rosin-epoxy compound is dispersed in water with the aid of an emulsifying and dispersing agent. The emulsifying and dispersing agent can be various kinds of low-molecular weight surfactants, polymer surfactants and protective colloids such as casein, polyvinyl alcohol, or modified starch, used singly or in combination.

Despite the efforts of the industry to develop cost-effective and efficient paper sizing dispersions having the appropriate desired properties, there are still many problems that have been encountered. Many polymers which are used to make sizing dispersions have limitations. If, on one hand, the molecular weight is too small, no final stabilization is possible because the steric effects are not there. On the other hand, if the molecular weight is high enough for a good steric effect, then ionic contamination can cause particle bridging and ensuing Theological problems during storage. In many cases, as in the use of naturally derived polymers such as starches, the molecular weight is not easily controllable and these hydrocolloids have limited use because of their great tendency to bridge. Sizing dispersions must be kept at low solids contents to prevent high Theological properties.

This invention uses a coacervate concept. Two oppositely charged polymers are mixed in such a proportion to produce a third system, a cationic colloidal coacervate, which functions as an emulsifier and stabilizer for dispersed rosin sizing agents. Using this technique, very little bridging between rosin particles is observed and thermal cross-linking of cationic resin adsorbed on neighboring rosin particles is also prevented. At the same time, the particle charge, which plays an important role in particle deposition on cellulose fiber, can be more precisely controlled, by controlling the ratio of the oppositely charged polymers making up the coacervate. The highly charged particles provide for better retention of the size in the pulp. Rosin-coacervate sizing agents of the present invention have enhanced sizing efficiency and are stable over anticipated periods of use and storage.

SUMMARY OF THE INVENTION

One aspect of the present invention relates to a dispersed rosin sizing composition comprising rosin stabilized by a cationic colloidal coacervate dispersing agent, the coacervate dispersing agent comprising an anionic component and a cationic component, the anionic and cationic components being present in a proportion such that the sizing composition has a zeta potential of at least about 20 millivolts.

Another aspect of the present invention relates to a cationic colloidal coacervate dispersion composition comprising water, a lignosulfonate as an anionic component and poly(diallyldimethylammonium chloride) as a cationic component, the anionic and cationic components being present in such proportion that the composition is cationic.

Yet another aspect of the present invention relates to a method of making a cationic rosin sizing dispersion comprising rosin and a colloidal coacervate dispersing agent, the method comprising the steps: (a) forming a colloidal coacervate dispersing agent comprising an anionic component and a cationic component in water; and (b) forming an aqueous dispersion of rosin in the colloidal coacervate, the dispersion having a zeta potential of at least about 20 millivolts.

Still another aspect of the present invention is a method of producing sized paper comprising employing in the manufacture of the sized paper a sizing composition comprising rosin stabilized by a cationic colloidal coacervate dispersing agent, the coacervate dispersing agent comprising an anionic component and a cationic component, the anionic and cationic components being present in a proportion such that the sizing composition has a zeta potential of at least about 20 millivolts.

A further aspect of the present invention is sized paper sized with a rosin sizing composition comprising rosin stabilized by a cationic colloidal coacervate dispersing agent, the coacervate dispersing agent comprising an anionic component and a cationic component, the anionic and cationic components being present in a proportion such that the sizing composition has a zeta potential of at least about 20 millivolts.

DETAILED DESCRIPTION OF THE PREFERRED EMBODIMENTS

This invention encompasses cationic coacervate systems which can be used to emulsify and stabilize rosin sizing dispersions. In general, these systems comprise a mixture of an anionic component and a cationic component, which, when mixed properly and in the right proportions in water, yield a cationic colloidal coacervate in an aqueous phase. This colloidal coacervate aqueous phase is then available for adsorption at the liquid/liquid interface of a molten rosin or rosin dissolved in an organic phase. Upon shearing the rosin and aqueous phases together, emulsification of the rosin within the aqueous medium occurs. Further processing, for example, upon cooling or solvent extraction, changes this emulsion into a dispersion (solid in liquid). The coacervate adsorbs at the surface or interface of the organic and aqueous phases as a multitude of soft gelatinous particles, thereby increasing the viscosity at that interface and yielding excellent stability. The coacervate used in the compositions of the present invention inhibits the diffusion of one liquid droplet into another, while in the emulsion form. The charge on the colloidal sizing agent particles can be controlled by controlling the ratio of the anionic and cationic components that make up the coacervate.

Each of the anionic and cationic components does not have to be water-soluble, as long as they are water-dispersible. For example, one can be colloidal and the other soluble. Because no true surfactants (i.e. micelle forming materials) are necessary, even though they can be used, the sizing compositions of the present invention are more hydrophobic and can also be of larger particle size. The sizing compositions thereby have better stability and less foaming than prior, surfactant-based rosin sizing agents, with the desired viscosity and sizing characteristics.

Rosin

The rosin useful for the present invention can be any modified or unmodified rosin suitable for sizing paper, including unfortified rosin, fortified rosin and extended rosin, as well as rosin esters, and mixtures and blends thereof.

The rosin used in this invention can be any of the commercially available types of rosin, such as wood rosin, gum rosin, tall oil rosin, and mixtures of any two or more, in their crude or refined state. Tall oil rosin and gum rosin are preferred. Partially hydrogenated rosins and polymerized rosins, as well as rosins that have been treated to inhibit crystallization, such as by heat treatment or reaction with formaldehyde, also can be employed.

A fortified rosin useful in this invention is the adduct reaction product of rosin and an acidic compound containing the group and is derived by reacting rosin and the acidic compound at elevated temperatures of from about 150° C. to about 210° C.

The amount of acidic compound employed will be that amount which will provide fortified rosin containing from about 1 to about 16% by weight of adducted acidic compound based on the weight of the fortified rosin. Methods of preparing fortified rosin are well known to those skilled in the art. See, for example, the methods disclosed and described in U.S. Pat. Nos. 2,628,918 and 2,684,300, the disclosures of which are incorporated herein by reference.

Examples of acidic compounds containing the group that can be used to prepare the fortified rosin include the alpha-beta-unsaturated organic acids and their available anhydrides, specific examples of which include fumaric acid, maleic acid, acrylic acid, maleic anhydride, itaconic acid, itaconic anhydride, citraconic acid and citraconic anhydride. Mixtures of acids can be used to prepare the fortified rosin if desired. Thus, for example, a mixture of the acrylic acid adduct of rosin and the fumaric acid adduct can be used to prepare the novel dispersions of this invention. Also, fortified rosin that has been substantially completely hydrogenated after adduct formation can be used.

Various rosin esters of a type well known to those skilled in the art can also be used in the rosin-coacervate dispersion of the present invention. Suitable exemplary rosin esters may be rosin esterified as disclosed in U.S. Pat. Nos. 4,540,635 (Ronge et al.) or 5,201,944 (Nakata et al.), the disclosures of which are incorporated herein by reference.

The unfortified or fortified rosin or rosin esters can be extended if desired by known extenders therefor such as waxes (particularly paraffin wax and microcrystalline wax); hydrocarbon resins including those derived from petroleum hydrocarbons and terpenes; and the like. This is accomplished by melt blending or solution blending with the rosin or fortified rosin from about 10% to about 100% by weight, based on the weight of rosin or fortified rosin, of the extender.

Also blends of fortified rosin and unfortified rosin; and blends of fortified rosin, unfortified rosin, rosin esters and rosin extender can be used. Blends of fortified and unfortified rosin may comprise, for example, about 25% to 95% fortified rosin and about 75% to 5% unfortified rosin. Blends of fortified rosin, unfortified rosin, and rosin extender may comprise, for example, about 5% to 45% fortified rosin, 0 to 50% rosin, and about 5% to 90% rosin extender.

The rosin component of the rosin-coacervate sizing composition of the present invention may vary depending on the type and grade of paper or paperboard being sized, the equipment used and whether the size is an internal or surface size. In general, it is preferred to use about 10 wt % to about 60 wt % of the rosin component, more preferably about 20 wt % to about 55 wt %, and still more preferably, about 35 wt % to about 50 wt % of rosin based on the dry weight of rosin in the aqueous rosin-coacervate dispersion composition.

Coacervate Components

The coacervate dispersing agent is used to form a stable dispersion of the rosin in water. The components must be able to form emulsions and dispersions of sufficient stability such that there is no separation adversely affecting use of the coacervate component or the rosin-coacervate dispersion.

For the rosin sizing agents discussed above for use in the present invention which contain carboxyl groups, both the anionic component and the cationic component used to form the aqueous colloidal coacervate dispersing agent preferably should have an acidic pH. The pH preferably should be sufficiently low to avoid ionizing the carboxyl groups of the rosin to such an extent that the resulting dispersion will not be stable. The pH also preferably should be sufficiently low to avoid forming a salt capable of destabilizing the dispersion. As a result, the pH of the components of the coacervate dispersing agent, the coacervate dispersing agent itself and the composition comprising the rosin and the coacervate dispersing agent preferably should be maintained in an acidic range, that is, with a pH below about 7, and preferably at a pH of about 2 to about 7, and more preferably about 4 to about 6.

The components used to make the coacervate colloidal dispersing agent will now be described, other than water. It is preferred to use the minimum amount of water that will allow for ease of handling and efficient formation of the coacervate and the paper sizing dispersion product.

Although the coacervate has two oppositely charged components, the overall charge on the coacervate and the sizing composition is cationic with a zeta potential of at least 20 millivolts (hereinafter "mvolts"), for reasons explained below. This means that there is enough of the cationic component to form a coacervate and also an excess of the cationic component to make sure that the final product is cationic. In this way, this process produces sizing dispersions which have higher cationic charge than most other processes. Such charge characteristics, if applied properly, can enhance the sizing efficiency of the product for sizing paper, including paperboard, with rosin, and particularly acid processed paper.

Anionic Component

The anionic component of the coacervate can broadly be any one or a mixture of anionic colloid or polyelectrolyte or surfactant, individually all of a type well known in the art. Examples of anionic colloids are clays, silicas or latexes. Examples of anionic polyelectrolytes are polycarboxylates (e.g., polyacrylates, carboxymethyl cellulose, hydrolyzed polyacrylamides), polysulfates (e.g., polyvinyl sulfate, polyethylene sulfate) or polysulfonates (e.g., polyvinyl sulfonate, lignin sulfonates). Examples of anionic surfactants are alkyl, aryl or alkyl aryl sulfates, alkyl, aryl or alkyl aryl carboxylates or alkyl, aryl or alkyl aryl sulfonates. Preferably, the alkyl moieties have about 1 to about 18 carbons, the aryl moieties have about 6 to about 12 carbons, and the alkyl aryl moieties have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates.

The preferred anionic components are polycarboxylates, polysulfates and polysulfonates. More preferred is a polysulfonate, preferably a ligno- or lignin sulfonate, such as the sodium salt, calcium salt, ammonium salt, iron salt or chromium salt.

A presently more preferred anionic component is sodium lignosulfonate which has not been neutralized with sodium hydroxide.

Cationic Component

The cationic component of the coacervate can broadly be any one or a mixture of a polymer, a colloid or a surfactant, individually all of a type well known in the art, as long as its or their use would result in a coacervate having the appropriate zeta potential discussed herein. Cationic polymers are preferred, such as polyamine, polysulfonium or polyamidoamine polymers. The polyamines may be primary amines, secondary amines, tertiary amines or quaternary amines or may contain a mixture of different strength amine groups such as polyethyleneimine.

The polymers which are particularly useful for this invention include homopolymers and copolymers having weight average molecular weights greater than about 5,000 as determined by size exclusion chromatography. Preferably, the polymers have molecular weights below about 500,000 and more preferably on the order of about 125,000 to about 350,000. The polymers should contain at least about 20% cationic functional groups, and preferably, 100% of the functional groups should be cationic. Preferred exemplary polymers are a quaternary polyamine, such as poly (diallyldialkylammonium chloride) wherein the alkyl moiety has 1 to about 6 carbons; a polyvinylamine; and the like.

A present more preferred type of cationic component is a quaternary polyamine such as a poly (diallyldialkylammonium chloride) wherein the alkyl moiety has 1 to about 6 carbons, the currently most preferred example being poly(diallyldimethylammonium chloride), sometimes referred to herein as "poly(DADMAC)." Other suitable quaternary polyamines include, for example, polymers of acryloxytrimethylammonium chloride (ATMAC), methylacryloxytrimethylammonium chloride (MTMAC), acryloyloxyethyltrimethylammonium chloride, methacryloyloxyethyltrimethylammonium chloride, methacryloyloxyethyltrimethylammonium methylsulfate or methacrylamidopropyltrimethylammonium chloride also including cationic copolymers of acrylamide with quaternary polyamines.

The preferred molecular weight would be chosen according to the final coacervate viscosifying effect. The preferred polymeric cationic components of the present invention, and especially the poly(DADMAC) polymers, preferably have an intrinsic viscosity of about 0.1 dl/g to about 2 dl/g, more preferably about 0.5 dl/g to about 1.7 dl/g and even more preferably about 1 dl/g to about 1.3 dl/g. This corresponds to a broad range for a solution viscosity of the cationic polymer of about 50 centipoise (cp) to about 5,000 cp, preferably about 100 cp to about 5,000 cp, and more preferably about 1,000 cp to about 3,000 cp, all measured at 20% solids. (Brookfield viscosities measured at 60 rpm at room temperature, about 25° C.).

The presently preferred cationic component is poly (DADMAC) available as Reten® 203 from Hercules Incorporated, Wilmington, Del. The Reten® 203 product is viscous enough to yield a Brookfield viscosity of about 2,000 cp in a 20% solution.

To make the proper coacervate, one preferably should use all or as much of the water available for the aqueous phase make-up. While the order of addition of the components forming the coacervate is not believed to be critical, it is preferred that the least viscous of the anionic or the cationic components be added to the water first. In the case where the anionic component is sodium lignosulfonate, sometimes referred to herein as "SLS", and the cationic component is poly(DADMAC), the SLS is mixed with the water first to form a first mixture. The parameters associated with mixing the coacervate components are not critical, as long as they are sufficient to result in a substantially homogeneous mixture. Typically and preferably, the mixing is conducted at room temperature (about 25° C.) and ambient pressure.

Once the first mixture is well mixed to be substantially homogeneous, then the most viscous component should be added with vigorous agitation to form a second mixture. As before, there are no critical mixing parameters. In this case where the anionic component is SLS and the cationic component is poly(DADMAC), the poly(DADMAC) is added second. The second mixture may visually appear quite nonhomogeneous but will become more colloidal and homogeneous during homogenization with the rosin. One can also run the coacervate through a homogenizer by itself to render it more homogeneous if desired.

The zeta potential charge on the coacervate dispersing agent will depend on the ratio of anionic and cationic components making up the coacervate. Likewise, the zeta potential on the final dispersion composition comprising rosin and the coacervate dispersing agent will depend on the ratio of the anionic and cationic components of the coacervate, as well as any residual charged functional groups on the rosin.

The coacervate and rosin-coacervate dispersion charge cannot be zero or close to neutral. Such systems do not work. To form an effective stable dispersion, the charge must be moderately to highly cationic. The zeta potential plays a strong role in the stability of sizing dispersions. The zeta potential is the potential across the interface of solids and liquids, specifically, the potential across the diffuse layer of ions surrounding a charged colloidal particle which is largely responsible for colloidal stability. Zeta potentials can be calculated from electrophoretic mobilities, namely, the rates at which colloidal particles travel between charged electrodes placed in the dispersion, emulsion or suspension containing the colloidal particles. A zeta potential value of zero to 10 mvolts will be an indicator of poor stability. A zeta potential value of 10 to 19 mvolts is an indicator of some, but usually insufficient stability. A zeta potential value of at least 20 mvolts, and preferably 25 to 40 mvolts is an indication of a moderate charge with good stability. A zeta potential value of greater than 40 to 100 mvolts or more normally indicates excellent stability. Thus, in the present invention, the sizing composition comprising the rosin and the coacervate must have a zeta potential of at least 20 mvolts. Thus, it is preferred that the coacervate and rosin-coacervate dispersion charge should be highly cationic, with a preferred zeta potential of at least 25 mvolts and, more preferably, at least 40 mvolts. This would correspond to better electrostatic colloidal stability of the final product. The highly cationic coacervate produces a final stable dispersion which interacts most strongly electrically with the cellulose pulp fibers.

The amounts and ratios of the anionic and cationic components used in the coacervate dispersing agent may vary considerably in view of the different types of anionic and cationic components. Factors include the molecular weight and intrinsic viscosities of the components, their respective charge densities, the particular type and amount of rosin to be dispersed in the final rosin-coacervate composition, the desired zeta potential, and other factors relating to stability, processing ability and performance, all of which can be determined empirically without undue experimentation in view of this disclosure.

The final viscosity of the sizing composition should be such that the composition can be easily pumped without any coagulation at about 10% to about 50% solids in the dispersion. The final viscosity of the rosin-coacervate sizing composition should also be sufficient to prevent is stratification of dispersed solid components. Within these broad guidelines, a preferred final rosin-coacervate composition viscosity should be from about 6 cp to less than about 250 cp Brookfield viscosity (measured at 60 rpm) and more preferably, less than about 200 cp. In formulations of the rosin-coacervate composition having a solids content of about 35 wt %, the viscosity preferably is about 15 to about 40 cp where the composition has a solids content of about 40 wt %, the viscosity preferably is about 30 to about 80 cp.

The amounts and ratios of the coacervate components used to make the coacervate can be readily determined by back-calculating the amounts desired in the final rosin-coacervate dispersion.

To make a coacervate dispersing agent having the beneficial properties discussed herein, the anionic component is preferably present in an amount of 0.1 to about 2 parts by weight, the cationic component is preferably present in an amount of 0.1 to about 5 parts by weight, based on the dry weight of the component in the aqueous coacervate dispersing agent, the balance being about 33 to about 90 parts by weight of water. The cationic to anionic components are preferred to be present in a ratio greater than about 0.1 of the cationic component to the anionic component.

A more preferred coacervate dispersing agent contains about 0.2 to about 1.5 parts by weight of anionic component, about 0.2 to about 3.5 parts by weight of cationic component, the balance being about 40 to about 80 parts by weight of water. The cationic component to anionic component ratio is more preferably about 0.6 to about 3.

A still more preferred coacervate dispersing agent contains about 0.4 to about 0.6 parts by weight of anionic component, about 0.6 to about 1.2 parts by weight of cationic component, with a cationic to anionic component ratio of about 1.2 to about 2.4. The balance is water in amounts of about 44 to about 64 parts by weight.

Once the aqueous coacervate phase is formed, then the rosin (either dissolved in a solvent to form an organic phase for a solvent process or melted in a high temperature process, typically using high temperature high pressure homogenization) can be homogenized into the aqueous phase. The coacervate will perform the emulsification and stabilize the resulting dispersion.

The general techniques of forming a paper sizing composition of the present invention comprising rosin dispersed in the coacervate will now be described, although the coacervate dispersing agent and the sizing agent including the rosin and the coacervate dispersing agent may be prepared by any other process suitable to make the desired product.

Generally, in the solvent process or method, the composition of the present invention is formed as a dispersion comprising the steps (i) dissolving the rosin in an organic solvent immiscible in water to form an organic phase; (ii) forming an aqueous phase of the cationic colloidal coacervate dispersing agent by mixing with water the anionic component and the cationic component in such proportions and with sufficient shear to form a cationic colloidal coacervate; (iii) homogenizing the organic phase and the aqueous phase coacervate dispersing agent to form an emulsion; and (iv) removing the organic solvent from the emulsion to form the dispersion. Steps (i) and (ii) may be reversed in order or done simultaneously. Moreover, processing may be batch processing, continuous processing or a combination thereof.

More specifically, in preparing the aqueous rosin dispersion of this invention by the solvent process, the rosin is first dissolved in a water-immiscible organic solvent, such as benzene, xylene, methylene chloride, chloroform, or 1,2-dichloropropane. Other solvents compatible with the desired end product and paper sizing operation can also be used. Mixtures of two or more solvents can be used if desired. The selected solvent will also be non-reactive with the components of the aqueous dispersion to be subsequently prepared.

A mixture is prepared with the organic phase rosin solution and the coacervate aqueous phase dispersing agent of cationic and anionic components. The essentially unstable aqueous mixture is then subjected to sufficient shear to provide an essentially stable emulsion. Sufficient shear is conveniently accomplished by means of a homogenizer, although the coacervate dispersing agent of the present invention allows the use of considerably less sophisticated equipment, such as a Waring® blender. Nevertheless, on a commercial scale, passing, at least once, the unstable aqueous mixture through a homogenizer at ambient temperature under a pressure on the order of from about 100 p.s.i.g. (7 kg/cm$^2$) to about 8,000 p.s.i.g. (560 kg/cm$^2$), preferably about 2,000 p.s.i.g. (140 kg/cm$^2$) to about 3,000 p.s.i.g. (210 kg/cm$^2$) will provide an essentially stable emulsion.

Subsequently, the organic solvent component of the emulsion is removed from the emulsion, as by stripping using vacuum distillation, and there is provided an essentially stable aqueous dispersion of rosin particles. These procedural steps are described in U.S. Pat. No. 3,565,755, the disclosure of which is hereby incorporated by reference.

The general technique used for the high temperature process or method will now be described for making the sizing composition of the present invention in the form of a dispersion. This general method comprises the steps: (i) heating the rosin to a temperature sufficient to melt the rosin; (ii) forming an aqueous phase of the cationic colloidal coacervate dispersing agent by mixing with water the anionic component and the cationic component in such proportions and with sufficient shear to form a cationic colloidal coacervate; (iii) mixing the molten rosin with the aqueous coacervate dispersing agent to form a mixture; (iv) subjecting the mixture of step (iii) to sufficient shear to form an emulsion; and (v) cooling the emulsion of step (iv) to form the dispersion. Steps (i) and (ii) may be reversed in order or done simultaneously and mixing step (iii) may be combined with emulsifying step (iv). Moreover, processing may be batch processing, continuous processing or a combination thereof.

More specifically, in preparing dispersions of this invention by the high temperature process, the rosin is heated past its melting point, preferably to at least about 135° C., and more preferably to about 165° C. to about 180° C., where it is less viscous. Preferably, the molten rosin is pumped, as is the coacervate, to a homogenizer where they are intimately mixed and emulsified at a temperature of from about 80° C. to about 195° C., preferably about 125° C. to about 145° C., to form an essentially stable aqueous emulsion. Sufficient shear is conveniently accomplished by means of a homogenizer. Thus, passing, at least once, the mixture through a homogenizer under a pressure on the order of about 1,000 p.s.i.g. (70 kg/cm$^2$) to about 8,000 p.s.i.g. (560 kg/cm$^2$), and preferably about 2,000 p.s.i.g. (140 kg/cm$^2$) to about 3,000 p.s.i.g. (210 kg/cm$^2$) will provide an essentially stable emulsion which forms a stable dispersion upon cooling. The pressure selected is within the skill of the art.

The following information relates to an exemplary presently preferred embodiment in which the anionic component is sodium lignosulfonate (SLS), such as Wanin® S, from LignoTech USA, Vargon, Sweden, and poly(DADMAC), such as Reten® 203, from Hercules Incorporated, Wilmington, Del., and having 19.3% solids, and an intrinsic viscosity of 1.3–1.5 dl/g. The anionic component may be present in an amount of 0.1 wt % to about 2 wt %, and the cationic component may be present from about 0.1 wt % to about 5 wt %, and the ratio of cationic component to anionic component is greater than about 0.1. Rosin may be present in an amount of about 10 wt % to about 60 wt %. All weight percents are calculated on the basis of the percentage of the dry weight of the component in the aqueous rosin-coacervate composition.

Preferred amounts are about 0.2 wt % to about 1.5 wt % of the anionic component, about 0.2 wt % to about 3.5 wt % of the cationic component, at a cationic to anionic component ratio of about 0.6 to about 3.0, with rosin present in an amount of about 20 wt % to about 55 wt %.

More preferred amounts of the ingredients are about 0.4 wt % to about 0.6 wt % of the anionic component, about 0.6 wt % to about 1.2 wt % of the cationic component, at a cationic to anionic component ratio of about 1.2 to about 2.4, with rosin present in an amount of about 35 wt % to about 50 wt %.

The amounts and ratios may change based on the use of anionic components other than SLS and cationic components other than Reten® 203. Use of these ingredients in the indicated ranges and ratios should produce a stable emulsion at sufficient viscosity for efficient homogenization and production of a stable rosin-coacervate dispersion composition. By using a lower molecular weight poly(DADMAC), such as one having an intrinsic viscosity of about 1.0 dl/g, higher cationic polymer contents can be obtained without having viscosity problems. This provides the ability to produce more cationic systems.

Emulsification with this coacervate system is also quite energetically favorable. Even a Waring® blender can serve the purpose for emulsification, although homogenization works better, as demonstrated using a Tekmar® homogenizer (Tekmar Company, Cincinnati, Ohio) and even better using a Manton-Gaulin® homogenizer (APV Gaulin Inc., Wilmington, Mass.).

Other additives, such as alum used to reduce viscosity, defoamers, biocides and other preservatives, can be added to the rosin-coacervate dispersion of the present invention in amounts and using techniques known to those in the paper-making industry.

The sizing composition in the form of the dispersion is employed in the manufacture of paper to be sized with the composition, typically as an additive to a papermaking furnish used to manufacture the sized paper. However, the composition of the present invention can also be applied as a surface treatment or external sizing agent by applying it to the surface of the paper after the paper is formed in a size press or other suitable application equipment using application techniques well known to those skilled in the art.

As noted above, rosin-based sizing compositions are used with papermaker's alum or other equivalent aluminum compounds. The alum or its equivalent can be incorporated into the sizing composition of the present invention or, more typically, the alum or its equivalent can be applied as a separate component to the pulp when the rosin-coacervate dispersion of the present invention is used as an internal size or when it is applied as an external, surface size. When the alum or its equivalent is mixed with the rosin-coacervate composition of this invention, the alum or its equivalent may be present in amounts up to about 50 wt % based on the weight of the rosin-coacervate composition including the alum. The amount of alum or its equivalent to be used is determined based on the type of alum or its equivalent used, the grade of paper being treated, the amount of sizing agent being applied, and other factors well known to those skilled in the art. In unbleached papermaking systems, for example, when added to the pulp as a separate component, alum or its equivalent is normally used at addition levels less than 1 wt %, based upon the dry weight of the pulp, and typically, at levels of about 0.1 wt % to about 0.8 wt %.

The rosin-coacervate composition of the present invention is used in amounts based on the desired sizing requirements of the customer, depending upon the required degree of sizing, the grade of paper, the type of pulp furnish used to make the paper, and other factors well known and easily determined empirically by those skilled in the art. In general, the least amount of sizing agent is used to obtain the desired sizing specifications.

When the sizing composition is applied as an internal additive during papermaking, it is preferred to use about 0.025 wt % to about 1 wt % based on the dry weight of the pulp.

When the composition of the present invention is employed as an external surface size, it is preferred to use about 0.01 wt % to about 1% of the composition based on the dry weight of the paper web.

Hercules Size Test

One well-recognized test for measuring sizing performance is the Hercules Size Test, described in *Pulp and Paper Chemistry and Chemical Technology*, J. P. Casey, Ed., Vol. 3, p. 1553–1554 (1981) and in TAPPI Standard T530, the disclosures of which are incorporated herein by reference. The Hercules Size Test determines the degree of water sizing obtained in paper by measuring the change in reflectance of the paper's surface as an aqueous solution of dye penetrates from the opposite surface side. The aqueous dye solution, e.g., naphthol green dye in 1% formic acid in Example 13 described below, is contained in a ring on the top surface of the paper, and the change in reflectance is measured photoelectrically from the bottom surface.

Test duration is limited by choosing a convenient end point, e.g., a reduction in reflected light of 20%, corresponding to 80% reflectance, in Example 13 described below. A timer measures the time (in seconds) for the end point of the test to be reached. Longer times correlate with increased sizing performance, i.e., resistance to water penetration increases. Unsized paper will typically fail at 0 seconds, lightly sized paper will register times of from about 1 to about 20 seconds, moderately sized paper from about 21 to about 150 seconds, and hard sized paper from about 151 to about 2,000 seconds.

EXAMPLES

The present invention will now be described with reference to the following specific, non-limiting Examples.

Unless otherwise noted in the Examples, the rosin-coacervate composition was prepared based on the solvent process as described above. The steps were carried out at room temperature (about 25° C.) and ambient pressure, except as otherwise noted. Specific processing details, where important, are specified, as are the appropriate properties and results of the studies in each of the Examples.

As used in the Examples, all percentages of components are weight percentages of the components on a dry basis, of the aqueous rosin-coacervate composition, unless otherwise noted. Percentages of water are by weight based on the weight of the aqueous rosin-coacervate composition.

Example 1

Preparation of a rosin size with a coacervate containing 0.5% SLS and 1.2% Reten® 203 using a Manton-Gaulin® homogenizer Organic phase rosin: 307 g of a 6.5% combined fumaric acid (CFA) rosin dissolved in 450 g of methylene chloride.

Aqueous phase coacervate: 5.3 g of SLS (sodium lignosulfonate, Wanin® S, from LignoTech USA, Vargon, Sweden), 65.3 g of Reten® 203 polymer (19.3% solids, intrinsic viscosity 1.3 dl/g and 600 g deionized water.

The SLS was dissolved first, then the Reten® 203 polymer was added. The pH was 4.2. The aqueous phase was mixed using the high setting on a Tekmar® homogenizer (laboratory model No. SD-45) while adding the organic phase. This took 15 seconds. This pre-mix was then passed through a Manton-Gaulin® homogenizer (model No. 15MS TBA) twice at 3,000 p.s.i. (210 kg/cm$^2$) pressure. Some dilution water was introduced to help start the homogenizer. The resulting emulsion was treated in a rotary evaporator to remove the methylene chloride solvent at a temperature above its boiling point (40° C.). The resulting emulsion was cooled to room temperature, at which time a rosin-coacervate dispersion was formed that had the following properties:

Total solids: 25.3%

Particle size: 578 nm (after passing through a 100 mesh sieve)

| Rheology: | rpm | viscosity, cp |
|---|---|---|
| | 6 | 70 |
| | 12 | 65 |
| | 30 | 56 |
| | 60 | 49 | pH: 2.8

The rheology data indicate that the dispersion has good stability, based on the small difference between the highest and lowest viscosity readings at the various rpm levels. Comparison and quantification are readily performed by taking the logarithm of the ratio of the lowest to highest reading. In this case, log(49/70)=−0.155. The calculated value can vary from zero to −1. The closer the calculated value is to zero, the more stable the product is. Values less than −0.3 (that is, values such as −0.4, rather than values such as −0.2) indicate that the dispersion may exhibit instability problems.

A sample of the sizing dispersion prepared in this Example was aged in an oven at 32° C. for 4 weeks and the viscosity was measured each week. The following 60 rpm viscosities and pH were measured using a Brookfield® LVT Viscometer (Brookfield Engineering Laboratories, Inc., Stoughton, Mass.) and a pH meter:

| | 1 week | 2 weeks | 3 weeks | 4 weeks |
|---|---|---|---|---|
| visc., cp: | 47 | 47 | 42 | 39 |
| pH: | 2.8 | 2.8 | 2.8 | 2.8 |

These lower viscosity results indicate good stability. The lower viscosity indicates that there is no bridging between the rosin particles and the dispersion is pumpable. The product did not gel under storage conditions.

The charge on the sizing particles in the dispersion was determined as the zeta potential (Z.P.) measured with a Lazer Zee° Meter model 501 (Pen Kem Inc., Bedford Hills, N.Y.). This was done by diluting 1 or 2 drops of the dispersion in 100 mls of deionized water and adjusting the pH with NaOH or $H_2SO_4$ to the values indicated below, except for pH 5.8, which was the pH of the composition without adjustment with acid or base. The following results show the cationic character of the new sizing composition. The high zeta potential value at pH 5.8 is due to no addition of acid or base.

| pH: | 3.1 | 4.7 | 5.8 | 8.0 | 9.0 |
|---|---|---|---|---|---|
| Z.P., mvolts | +36.0 | +43.2 | +52.2 | +35.5 | +28.3 |

As can be seen by the positive Z.P. readings, the sizing particles are cationic, even in the alkaline range. The Z.P. readings indicated good to excellent stability of the dispersion. Also, no post addition of alum or any other dispersing agent is needed to preserve stability.

Example 2

Preparation of a rosin size with a coacervate containing 0.5% SLS and 0.6% Reten® 203 using a Manton-Gaulin® homogenizer The same techniques were used as in Example 1.
Organic phase rosin: 307 g of a 6.5% combined fumaric acid (CFA) rosin dissolved in 450 g of methylene chloride.
Aqueous phase coacervate: 5.3 g of SLS (Wanin® S), 32.6 g, of Reten® 203 (19.3% solids) and 600 g deionized water.

The SLS was dissolved first, then the Reten® polymer was added.

The following properties of the rosin-coacervate product were observed: Total solids: 30.3% Particle size: 557 nm (after passing through a 100 mesh sieve)

| Rheology: | rpm | viscosity, cp |
|---|---|---|
| | 6 | 60 |
| | 12 | 45 |
| | 30 | 36 |
| | 60 | 33 | log(33/60) = −0.26, indicating good stability
pH: 2.8

A sample was aged in an oven at 32° C. for 4 weeks and the viscosity was measured each week. The following 60 rpm viscosities and pH were observed, indicating excellent stability:

| | 1 week | 2 weeks | 3 weeks | 4 weeks |
|---|---|---|---|---|
| visc., cp: | 33 | 34 | 35 | 31 |
| pH: | 2.8 | 2.8 | 2.8 | 2.8 |

The charge on the particles was determined as the zeta potentials measured with a Lazer Zee® Meter model 501. This was done by diluting 1 or 2 drops of the dispersion in 100 ml of deionized water and adjusting the pH with NaOH or $H_2SO_4$. The following results show the cationic character of the new sizing composition. The Z.P. readings greater than 40 in the acidic range, the range desired for this particular sizing composition, indicated excellent stability.

| pH: | 3.4 | 4.6 | 8.0 | 9.0 |
|---|---|---|---|---|
| Z.P., mvolts | +45.3 | +44.0 | +20.4 | +17.9 |

Example 3

No polymer, rosin only
An attempt was made to emulsify rosin only, as in Example 3, but without Reten® polymer, anionic component or alum. The product failed rapidly. The emulsion broke quickly into 3 layers immediately after being made and could not even be stripped of solvent.

Example 4

Preparation (failure) without the anionic component
A sample of rosin size was prepared using the solvent process following the techniques of Example 1. The following formulation was used:
Organic phase rosin: 136 g of a 5.4% combined fumaric acid rosin dissolved in 204.5 g of methylene chloride
Aqueous phase: 21 g Reten® 203 (19.3% solids) 403.3 g deionized water 44.5 g of 50% alum Procedure: The Reten® polymer was mixed with the deionized water. The pH of this solution was 5.75. It was lowered to 4.2 with 5N HCl. The water phase was mixed with the organic phase and passed through a Manton-Gaulin® homogenizer. The emulsion destabilized while stripping off the solvent at 70° C.

Example 5

1% Reten® 203 fails without anionic component
An attempt was made to form a dispersion of rosin sizing agent and Reten® 203 without the lignosulfonate anionic component following the general techniques of Example 1, as follows.
Organic phase rosin: 300 mls methylene chloride and 409 g of a 6.5% CFA rosin
Aqueous phase: 807 g deionized water 14 g Reten® 203 (19.3% solids)
A. Emulsification was attempted in a Manton-Gaulin® homogenizer using two passes. The solvent was stripped at 60° C. and a sizeable quantity of rosin material separated out. The system failed while standing.
B. A similar experiment was run using the Tekmar® homogenizer and some alum in the water phase:
Organic phase rosin: 205 g of 6.5% CFA rosin in 136 g methylene chloride
Aqueous phase: 403 g deionized water 7 g Reten® 203 (19.3% solids) 44.5 g of 50% alum
The organic and aqueous phases were homogenized in a Tekmar® homogenizer. The emulsion looked fine but failed during stripping at 55° C.

Comparing Examples 4 and 5, in Example 4, the pH was lowered to what was believed to be a more preferred pH. In Example 5, the pH of 5.8 was not adjusted. These Examples demonstrate that emulsions made without the anionic component are not stable.

Example 6

Factorial (statistical) experiment on SLS-Reten® 203 sizing emulsions
A statistical experiment was run with two variables: the SLS (Wanin® S) and the Reten® 203 (19.3% solids) concentration. Otherwise, the techniques used in this example are those used in Example 1, except as otherwise noted.
Organic phase rosin: 307 g of 6.5% CFA rosin in 450 g of methylene chloride Aqueous phase: The SLS concentration was varied from 0.5% to 3% and the Reten® polymer concentration from 0.6% to 1.2%. The mid-point was 1.75% SLS and 0.9% Reten® polymer.

The following results were observed:

| Designation | % SLS | % Reten® 203 | Result | Viscosity (cp) | Diameter (nm) |
|---|---|---|---|---|---|
| A | 0.5 | 0.6 | stable | 45 | 1065 |
| B | 0.5 | 1.2 | stable | 70 | 911 |
| C | 3 | 0.6 | failed | | |
| D | 3 | 1.2 | failed | | |
| E | 1.75 | 0.9 | less stable | 30 | 3174 |

As can be seen, there are preferred ratios of the anionic and cationic components of the coacervate for making the rosin size dispersions of this invention. Although it would seem that the SLS would play the role of the emulsifier, it is the total coacervate, at the proper ratio and concentration of the cationic and anionic components, which ultimately controls the final stability and the emulsification action. Using 3% (dry basis) SLS did not produce stable systems. Even using 1.75% SLS was only marginal. Using too much cationic polymer (Reten® 203) produced unacceptably viscous systems. Other experiments showed that the more preferred lower limit of SLS using SLS (Wanin® S) and Reten® 203 as the coacervate components is about 0.4% SLS to still produce effective emulsification. Other types and/or molecular weights, degree of cationic charge and viscosity of the components could be used to obtain the desired final properties without undue experimentation in view of this disclosure.

Example 7
Effect of varied Reten® 203 concentration

Following the general procedures of Examples 1 and 6, samples of rosin-coacervate sizes were made at 0.5% SLS (Wanin® S) and 0.5, 0.4, and 0.3% Reten® 203, as indicated in the following table:

| | 0.5% Reten grams | 0.4% Reten grams | 0.3% Reten grams |
|---|---|---|---|
| Organic Phase: | | | |
| rosin (6.5% CFA) | 102.25 | 102.25 | 102.25 |
| methylene chloride | 150 | 150 | 150 |
| Aqueous base: | | | |
| Wanin® S (SLS) | 1.75 | 1.75 | 1.75 |
| Reten® 203 (19.3%) | 9.07 | 7.25 | 5.44 |
| deionized water | 200 | 200 | 200 |
| Total | 463.07 | 461.25 | 459.44 |
| % SLS (calc) | 0.56 | 0.56 | 0.57 |
| % Reten® (calc) | 0.56 | 0.45 | 0.34 |
| Reten®/(calc) SLS ratio | 1.0 | 0.8 | 0.6 |
| Total (calc) % Solids | 33.8 | 33.9 | 33.9 |

A concentration of 0.4% Reten® 203 was the lowest concentration in this particular coacervate dispersing agent using these particular ingredients which would give an emulsion which did not abruptly break up.

Example 8
Effect of higher solids

Two formulations, A and B, were made following the general techniques of Examples 1 and 6, using the Tekmar® laboratory bench homogenizer at the higher Reten® 203 concentrations and having the components and amounts as indicated below. The target solids were 40%. The following characteristics of the dispersions were achieved:

| | A 0.6% Reten grams | B 1.2% Reten grams |
|---|---|---|
| Organic Phase: | | |
| rosin | 102.25 | 102.25 |
| methylene chloride | 150 | 150 |
| Aqueous Phase: | | |
| Wanin® S (SLS) | 1.75 | 1.75 |
| Reten® 203 (19.3%) | 10.88 | 21.76 |
| deionized water | 159.15 | 149.74 |
| Total | 424.03 | 425.5 |
| % SLS (calc) | 0.64 | 0.64 |
| % Reten® (calc) | 0.77 | 1.52 |
| Reten®/SLS ratio (calc) | 1.2 | 2.4 |
| Total % Solids (calc) | 38.7 | 39.3 |
| Particle size (nm) | 1981 | 2143 |
| Viscosity (60 rpm-cp) | 54 | 140 |

The higher concentration of the Reten® 203 in this Example caused the viscosity to increase substantially but the samples were acceptable and stable to heat aging at 32° C. for four weeks.

Example 9
Effect of neutralized SLS

The techniques of the previous Examples were used, except as noted, to determine the effect of using a neutralized SLS product, rather than the acidic SLS (Wanin® S) product used in Examples 1 through 8.

The 0.5% SLS and 0.6% Reten® 203 system was prepared using different SLS products (Lignosol® SFX-65, Ufoxane® 2, both from LignoTech USA, Rothschild, Wis.). Lignosol® SFX-65, when dissolved in water, had a pH of 7.2, which shows that it is a pre-neutralized product. Ufoxane® 2 has an even higher degree of neutralization (SLS/water pH of 9.0). Other components and amounts are listed below:

| | Lignosol® SFX-65 grams | Ufoxane® 2 grams |
|---|---|---|
| rosin (6.5% CFA) | 102.25 | 102.25 |
| methylene chloride | 150 | 150 |
| SLS | 1.75 | 1.75 |
| Reten® 203 (19.3%) | 10.88 | 10.88 |
| deionized water | 238.8 | 238.8 |
| Total | 503.68 | 503.68 |
| % SLS (calc) | 0.49 | 0.49 |
| % Reten® (calc) | 0.59 | 0.59 |
| Reten®/SLS ratio (calc) | 1.2 | 1.2 |
| Total % Solids (calc) | 30.0 | 30.0 |

The Tekmar® homogenizer was used to make the emulsion. The emulsion had poor stability while stripping and large amounts of solids could be filtered out. When this experiment containing Lignosol® SFX-65 was repeated with a pH adjustment of the aqueous phase to pH 4.0, instability was still encountered. The composition using Ufoxane® 2 also failed.

It is believed that the neutralization of the SLS causes the rosin's carboxyl groups to ionize, resulting in a lower zeta potential on the rosin-coacervate particles produced using neutalized SLS components. When the pre-neutralized Lignosol® SFX-65 product was later acidified, a salt was formed which results in an unstable product.

Example 10
Lower molecular weight poly(DADMAC)

A lower molecular weight poly(DADMAC) having an intrinsic viscosity of 1.0 dl/g, 20% solids, pH of 6, viscosity at 20% solids of 700 cp, was used instead of Reten® 203 to make a rosin size. Other than as indicated, the techniques in the experiments of this Example were the same used in the previous Examples. The amounts of components were as follows:

|  | Formulation grams |
|---|---|
| Organic phase: | |
| rosin (6.5% CFA) | 102.25 |
| methylene chloride | 150 |
| Aqueous phase: | |
| Wanin ® S (SLS) | 1.75 |
| poly(DADMAC) (20% solids) | 14 |
| deionized water | 232 |
| Total | 500 |
| % SLS (calc) | 0.50 |
| % Reten ® (calc) | 0.77 |
| Reten ®/SLS ratio (calc) | 1.54 |
| Total % Solids (calc) | 30.5 |

In this case, test tube scale experiments demonstrated that emulsions could be made rather easily at 0.6 to 1.0% poly(DADMAC). Using 0.5% Wanin® S SLS and 0.8% of the lower molecular weight poly(DADMAC), a stable 29.6% solids rosin sizing dispersion could be made with a Tekmar® homogenizer, by mixing the aqueous phase using the high setting while adding the organic phase. This took 2 minutes.

Example 11
Constant Reten® 203/SLS ratio systems, ratio=0.6/0.5=1.2

The same procedures, except as noted below, were used in this Example as in the previous Examples. Samples having the components and amounts listed below were made at a constant coacervate cationic/anionic component ratio of 1.2, but at increasing total coacervate concentrations to see the effect on product processing and characteristics.

| Formulation | A grams | B grams | C grams | D grams | E grams |
|---|---|---|---|---|---|
| Organic Phase: | | | | | |
| rosin (6.5% CFA) | 29.21 | 29.21 | 29.21 | 29.21 | 29.21 |
| methylene chloride | 43 | 43 | 43 | 43 | 43 |
| Aqueous phase: | | | | | |
| Wanin ® S (SLS) | 0.25 | 0.5 | 0.75 | 1 | 1.25 |
| Reten ® 203 | 1.55 | 3.11 | 4.66 | 6.22 | 7.77 |
| deionized water | 68.99 | 67.18 | 65.38 | 63.37 | 61.52 |
| Total | 143 | 143 | 143 | 142.8 | 142.75 |
| % SLS (calc) | 0.25 | 0.50 | 0.75 | 1.00 | 1.25 |
| % Reten ® (calc) | 0.30 | 0.60 | 0.90 | 1.20 | 1.50 |
| Reten ®/SLS ratio (calc) | 1.2 | 1.2 | 1.2 | 1.2 | 1.2 |
| Total % Solids (calc) | 29.8 | 30.3 | 30.9 | 31.5 | 32.0 |

The dispersions were made by pouring the organic phase into the aqueous phase under high shear using a Tekmar® homogenizer as in Example 10. Each sample was homogenized for 2 minutes. The following product characteristics were determined:

| Designation: | A | B | C | D | E |
|---|---|---|---|---|---|
| Diameter, nm | 1900 | 1659 | 2926 | 2056 | 973 |
| Z.P. mvolts | +29.0 | +30.0 | +28.0 | +30.3 | +29.7 |
| Viscosity, cp | 13 | 18 | 32 | 29 | 37 |

The zeta potential measurement was a simple one point measurement of a drop diluted in 100 mls of deionized water. The pH of such a measurement was normally 5.6 which is not a more preferred pH for this cationic rosin sizing product. A more preferred pH is about 4.5 to 4.8. This measurement does show good control, however, by keeping the coacervate component ratio constant.

All these systems were quite stable and only the viscosity was increased within acceptable limits by going to higher coacervate concentrations. This demonstrates that the amounts of the components may be varied within the appropriate ratios discussed above.

Example 12
Constant Reten® 203 SLS ratio systems, ratio=1.2/0.5=2.4

This is essentially the same experiment as in Example 11, except a higher cationic/anionic component ratio is used. The components and amounts in the composition are as follows:

| Formulation | A grams | B grams | C grams | D grams | E grams |
|---|---|---|---|---|---|
| Organic phase: | | | | | |
| rosin (6.5% CFA) | 43.82 | 43.82 | 43.82 | 43.82 | 43.82 |
| methylene chloride | 65 | 65 | 65 | 65 | 65 |
| Aqueous phase: | | | | | |
| Wanin ® S (SLS) | 0.38 | 0.75 | 1.13 | 1.5 | 1.88 |
| Reten ® 203 | 4.66 | 9.33 | 13.99 | 18.65 | 23.32 |
| deionized water | 101.14 | 96.1 | 91.06 | 86.03 | 80.98 |
| Total | 215 | 215 | 215 | 215 | 215 |
| % SLS (calc) | 0.25 | 0.50 | 0.75 | 1.00 | 1.25 |
| % Reten ® (calc) | 0.60 | 1.20 | 1.80 | 2.40 | 3.00 |
| Reten ®/SLS ratio (calc) | 2.37 | 2.40 | 2.39 | 2.40 | 2.39 |
| Total % Solids (calc) | 30.1 | 30.9 | 31.8 | 32.6 | 33.5 |

The results of measurements like those in Example 11 are as follows:

| Designation: | A | B | C | D | E |
|---|---|---|---|---|---|
| Diameter, nm | 2407 | 1720 | 2021 | 2483 | 3067 |
| Z.P., mvolts | +28.5 | +34.2 | +48.9 | +48.4 | +49.5 |
| Viscosity, cp | 22 | 33 | 49 | 75 | 95 |

This particular ratio still forms good emulsions but is more sensitive to viscosity. A higher cationic charge can also be obtained as indicated by the zeta potential values.

Example 13
Sizing efficiency

The sizing efficiency was measured, using a pilot laboratory paper forming machine, of two products of the present invention having the compositions noted below:

| Formulation | Low Reten® grams | High Reten® grams |
| --- | --- | --- |
| Organic phase: | | |
| rosin (6.5% CFA) | 306.75 | 306.75 |
| methylene chloride | 450 | 450 |
| Aqueous phase: | | |
| Wanin® S (SLS) | 5.25 | 5.25 |
| Reten® 203 | 32.64 | 65.28 |
| deionized water | 600 | 600 |
| Total | 1394.64 | 1427.28 |
| % SLS (calc) | 0.56 | 0.54 |
| % Reten® (calc) | 0.67 | 1.29 |
| Reten®/SLS ratio (calc) | 1.2 | 2.4 |
| Total % Solids (calc) | 33.7 | 33.2 |

Fine paper was run using a 70/30 hardwood/softwood bleached blend at 40 pound basis weight. The rosin-coacervate sizing agents of this invention were added to the pulp at the wet end of the machine. Alum (aluminum sulfate) was added separately in an amount of 0.75 wt % based on the dry pulp weight. Sizing level was varied from 0.2% to 0.5% on the pulp fiber and the sizing efficiency was measured using the Hercules Size Test described above. Two sizing samples were tried, one with a lower cationic/anionic component ratio (1.2) of 0.6% Reten 203/0.5% SLS and one with a higher cationic/anionic component ratio (2.4) of 1.2% Reten® 203/0.5% SLS.

It is important for understanding the concept of this invention that one realizes that a strong effect on sizing efficiency is relatable to the coacervate portion of the product. There may be other important variables, but according to this invention, the coacervate can play a major role in the final efficiency of the product.

Figure 1:
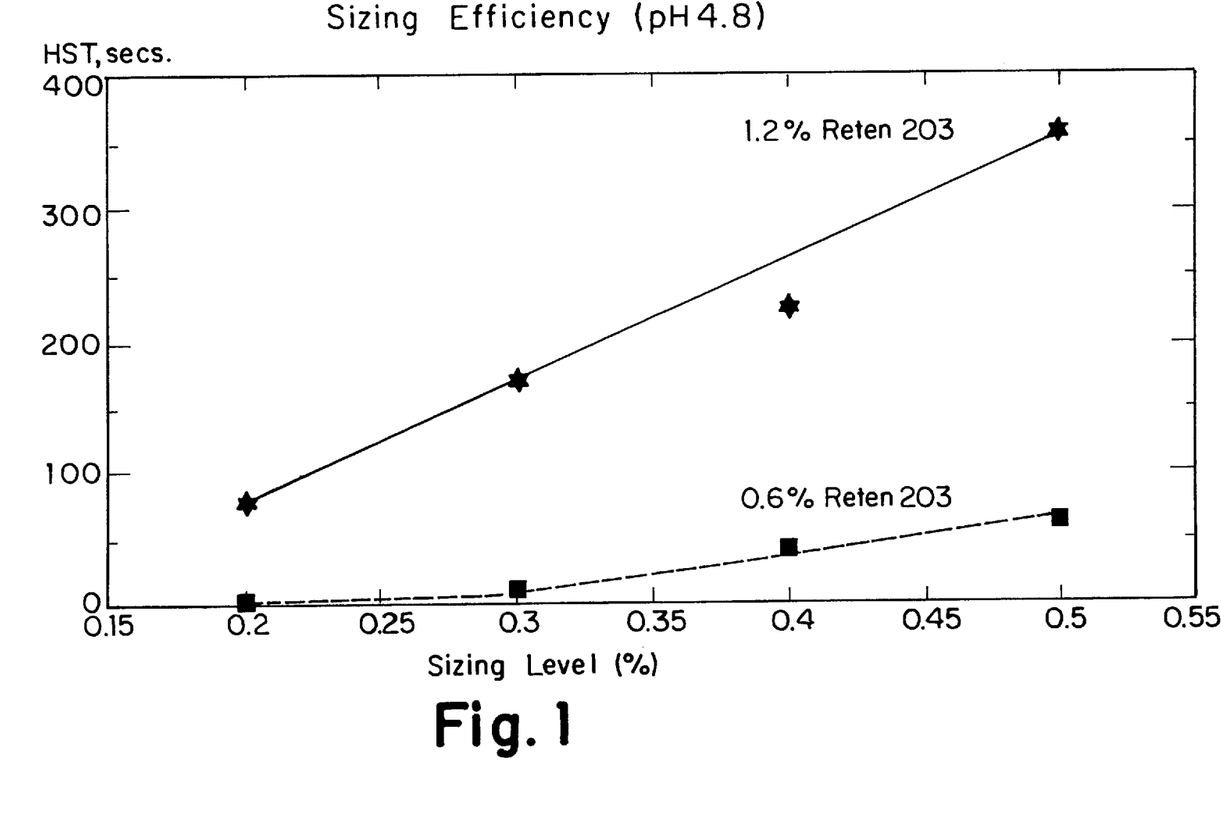
FIG. 1 is a graph showing the sizing efficiency of two different preferred products of the present invention. The amount of product used is graphed against the sizing efficiency as measured by the Hercules Size Test described below.

The results are shown in the graph of FIG. 1.

The lower, dashed line on the graph shows a relatively lower, but still acceptable sizing efficiency when a lower amount of the cationic component is used, compared to the upper, solid line representing the higher sizing efficiency of the product of the present invention using a higher amount of the cationic component. It is believed that the greater sizing efficiency exhibited by the product with the greater proportion of the cationic component is consistent with the concept that the rosin-coacervate of the present invention having a higher cationic charge adsorbs better on the fiber surface of the pulp to render the paper hydrophobic.

The present invention may be embodied in other specific forms without departing from the spirit or essential attributes thereof and, accordingly, reference should be made to the appended claims, rather than to the foregoing specification, as indicating the scope of the invention.

I claim:

1. A dispersed rosin sizing composition comprising rosin stabilized by a cationic colloidal coacervate dispersing agent, the coacervate dispersing agent comprising an anionic component and a cationic component, the anionic and cationic components being present in a proportion such that the sizing composition has a zeta potential of at least about 20 millivolts.

2. The composition of claim 1 wherein the anionic component is selected from the group consisting of an anionic colloid, polyelectrolyte and surfactant.

3. The composition of claim 2 wherein the anionic component is an anionic colloid selected from the group consisting of clay, silica and latex.

4. The composition of claim 2 wherein the anionic component is an anionic polyelectrolyte selected from the group consisting of polycarboxylate, polysulfate and polysulfonate.

5. The composition of claim 4 wherein the anionic component is an anionic lignosulfonate.

6. The composition of claim 2 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

7. The composition of claim 1 wherein the cationic component is selected from the group consisting of a cationic polyamine, a polysulfonium and a polyamidoamine, the cationic component having a weight average molecular weight of at least about 5,000 and containing at least about 20% cationic functional groups.

8. The composition of claim 7 wherein the cationic component is a cationic polyamine selected from the group consisting of a primary amine, a secondary amine, a tertiary amine, a quaternary amine and mixtures thereof.

9. The composition of claim 8 wherein the cationic polyamine is a quaternary polyamine.

10. The composition of claim 9 wherein the quaternary polyamine is a poly(diallyldialkylammonium chloride), wherein the alkyl moiety has 1 to about 6 carbons.

11. The composition of claim 10 wherein the quaternary polyamine is poly(diallyldimethylammonium chloride) having an intrinsic viscosity of about 0.1 dl/g to about 2.0 dl/g.

12. The composition of claim 1 wherein the rosin is selected from the group consisting of unmodified rosin, fortified rosin, rosin ester and extended rosin.

13. The composition of claim 1 wherein the anionic component is present in an amount of about 0.2 wt % to about 2 wt % and the cationic component is present in an amount of about 0.1 wt % to about 5 wt %, all wt % being on a dry basis of the component in the composition, the cationic and anionic components being present in a ratio greater than about 0.1 of cationic to anionic components.

14. The composition of claim 13 wherein the rosin is present in an amount of about 10 wt % to about 60 wt % on a dry basis of the rosin in the composition.

15. The composition of claim 14 wherein the rosin is present in an amount of about 20 wt % to about 50 wt %, the anionic component is sodium lignosulfonate present in an amount of about 0.2 wt % to about 1.5 wt %, and the cationic component is poly(diallyldimethylammonium chloride) with an intrinsic viscosity of about 0.5 dl/g to about 1.7 dl/g present in an amount of about 0.2 wt % to about 3.5 wt %, the cationic and anionic components being present in a ratio of about 0.6 to about 3 of cationic to anionic components.

16. The composition of claim 1 wherein the zeta potential is at least 25 millivolts.

17. The composition of claim 1 wherein the zeta potential is at least 40 millivolts.

18. A cationic colloidal coacervate dispersion composition comprising water, a lignosulfonate as an anionic component and poly(diallyldimethylammonium chloride) as a cationic component, the anionic and cationic components being present in such proportion that the composition is cationic and has a zeta potential of at least about 20 millivolts.

19. The composition of claim 18 wherein the lignosulfonate is sodium lignosulfonate and the poly(diallyldimethylammonium chloride) has an intrinsic viscosity of about 0.1 dl/g to about 2.0 dl/g.

20. The composition of claim 19 wherein the anionic component is present in an amount of about 0.1 wt % to about 2 parts by weight and the cationic component is present in an amount of about 0.1 to about 5 parts by weight, based on a dry basis of the component in the composition, the cationic and anionic components being present in a ratio greater than about 0.1 of cationic to anionic components.

21. The composition of claim 20 wherein the anionic component is present in an amount of about 0.2 wt % to about 1.5 wt %, and the cationic component has an intrinsic viscosity of about 0.5 dl/g to about 1.7 dl/g and is present in an amount of about 0.2 to about 3.5 parts by weight, the cationic and anionic components being present in a ratio of about 0.6 to about 3 of cationic to anionic components.

22. The composition of claim 18 wherein the zeta potential is at least 25 millivolts.

23. The composition of claim 18 wherein the zeta potential is at least 40 millivolts.

24. A method of making a cationic rosin sizing dispersion comprising rosin and a colloidal coacervate dispersing agent, the method comprising the steps:
  (a) forming a colloidal coacervate dispersing agent comprising an anionic component and a cationic component in water; and
  (b) forming an aqueous dispersion of rosin in the colloidal coacervate, the dispersion having a zeta potential of at least about 20 millivolts.

25. The method of claim 24 wherein the anionic component is selected from the group consisting of an anionic colloid, polyelectrolyte and surfactant, and the cationic component is selected from the group consisting of a cationic polyamine, a polysulfonium and a polyamidoamine, the cationic component having a weight average molecular weight of at least about 5,000 and containing at least about 20% cationic functional groups.

26. The method of claim 25 wherein the anionic component is an anionic polyelectrolyte selected from the group consisting of a polycarboxylate, polysulfate and polysulfonate, and the cationic component is a quaternary polyamine.

27. The method of claim 26 wherein the anionic component is an anionic lignosulfonate and the cationic component is poly(diallyldimethylammonium chloride).

28. The method of claim 27 wherein the rosin is present in an amount of about 10 wt % to about 60 wt %, the anionic component is sodium lignosulfonate present in an amount of about 0.2 wt % to about 2 wt %, and the cationic component is poly(diallyldimethylammonium chloride) with an intrinsic viscosity of about 0.1 dl/g to about 2 dl/g present in an amount of about 0.1 wt % to about 5 wt %, all wt % being on a dry basis of the component in the composition, the cationic and anionic components being present in a ratio greater than about 0.1 of cationic to anionic components, and wherein the dispersion has a Brookfield viscosity of up to about 150 cp measured at 60 rpm.

29. The method of claim 28 wherein the rosin is present in an amount of about 20 wt % to about 50 wt %, the anionic component is sodium lignosulfonate present in an amount of about 0.2 wt % to about 1.5 wt %, and the cationic component is poly(diallyldimethylammonium chloride) present in an amount of about 0.2 wt % to about 3.5 wt %, the cationic and anionic components being present in a ratio of about 0.6 to about 3 of cationic to anionic components.

30. The method of claim 24 wherein the rosin contains carboxyl groups and the anionic component and the cationic component both have an acidic pH which is sufficiently low to avoid ionizing the carboxyl groups of the rosin to such an extent that the coacervate formed in step (a) will not be stable, and the pH is sufficiently high to avoid forming a salt capable of destabilizing the dispersion.

31. The method of claim 30 wherein the pH in steps (a) and (b) is below about 7.

32. The method of claim 31 wherein the pH in steps (a) and (b) is about 2 to about 7.

33. The method of claim 24 wherein the dispersion forming step (b) is a solvent method comprising the steps:
  (i) dissolving the rosin in an organic solvent immiscible in water to form an organic phase;
  (ii) forming an aqueous phase of the cationic colloidal coacervate dispersing agent by mixing with water the anionic component and the cationic component in such proportions and with sufficient shear to form a cationic colloidal coacervate;
  (iii) homogenizing the organic phase and the aqueous phase coacervate dispersing agent to form an emulsion; and
  (iv) removing the organic solvent from the emulsion to form the dispersion.

34. The method of claim 33 wherein step (b) (ii) further comprises mixing in water the least viscous of the anionic component or the cationic component to form a first mixture; mixing with the first mixture the more viscous of the anionic component or the cationic component in a manner to form a second mixture, the cationic component being present in excess compared to the anionic component; and homogenizing the second mixture in a homogenizer to form a cationic colloidal coacervate.

35. The method of claim 24 wherein the dispersion forming step (b) is a high temperature method comprising the steps:
  (i) heating the rosin to a temperature sufficient to melt the rosin;
  (ii) forming an aqueous phase of the cationic colloidal coacervate dispersing agent by mixing with water the anionic component and the cationic component in such proportions and with sufficient shear to form a cationic colloidal coacervate;
  (iii) mixing the molten rosin with the aqueous phase coacervate dispersing agent to form a mixture;
  (iv) subjecting the mixture of step (iii) to sufficient shear to form an emulsion; and
  (v) cooling the emulsion of step (iv) to form the dispersion.

36. The method of claim 35 wherein steps (iii) and (iv) are combined.

37. The method of claim 24 wherein the zeta potential is at least 25 millivolts.

38. The method of claim 24 wherein the zeta potential is at least 40 millivolts.

39. A method of producing sized paper comprising employing in the manufacture of the sized paper a sizing composition comprising rosin stabilized by a cationic colloidal coacervate dispersing agent, the coacervate dispersing agent comprising an anionic component and a cationic component, the anionic and cationic components being present in a proportion such that the sizing composition has a zeta potential of at least about 20 millivolts.

40. The method of claim 39 wherein the paper sizing composition is employed in an amount of about 0.025 wt % to about 1 wt % based on the weight of the paper.

41. The method of claim 39 wherein the paper sizing composition is employed as an additive to a papermaking furnish used to manufacture the sized paper.

42. The method of claim 39 wherein the paper sizing composition is applied to the surface of the paper after the paper is formed.

43. The method of claim 39 wherein the anionic component is selected from the group consisting of an anionic colloid, polyelectrolyte and surfactant.

44. The method of claim 43 wherein the anionic component comprises an anionic colloid selected from the group consisting of clay, silica and latex.

45. The method of claim 43 wherein the anionic component is an anionic polyelectrolyte selected from the group consisting of polycarboxylate, polysulfate and polysulfonate.

46. The method of claim 45 wherein the anionic component is an anionic lignosulfonate.

47. The method of claim 43 wherein the anionic component is an anionic surfactant selected from the group consisting of alkyl carboxylate, alkyl sulfate, alkyl sulfonate, aryl carboxylate, aryl sulfate, aryl sulfonate, alkyl aryl carboxylate, alkyl aryl sulfate and alkyl aryl sulfonate, the alkyl moieties having 1 to about 18 carbons, the aryl moieties having 6 to about 12 carbons and the alkyl aryl moieties having 7 to about 30 carbons.

48. The method of claim 39 wherein the cationic component is selected from the group consisting of a cationic polyamine, a polysulfonium and a polyamidoamine, the cationic component having a molecular weight of at least about 5,000 and containing at least about 20% cationic functional groups.

49. The method of claim 48 wherein the cationic component is a cationic polyamine selected from the group consisting of a primary amine, a secondary amine, a tertiary amine, a quaternary amine and mixtures thereof.

50. The method of claim 49 wherein the cationic polyamine is a quaternary polyamine.

51. The method of claim 50 wherein the quaternary polyamine is a poly(diallyldialkylammonium chloride), wherein the alkyl moiety has 1 to about 6 carbons.

52. The method of claim 51 wherein the quaternary polyamine is poly(diallyldimethylammonium chloride) having an intrinsic viscosity of about 0.1 dl/g to about 2 dl/g.

53. The composition of claim 39 wherein the rosin is selected from the group consisting of unmodified rosin, fortified rosin, rosin ester and extended rosin.

54. The method of claim 53 wherein the rosin is present in an amount of about 20 wt % to about 50 wt %, the anionic component is sodium lignosulfonate present in an amount of about 0.2 wt % to about 1.5 wt %, and the cationic component is poly(diallyldimethylammonium chloride) with an intrinsic viscosity of about 0.1 dl/g to about 2 dl/g present in an amount of about 0.2 wt % to about 3.5 wt %, all wt % being on a dry basis of the component in the composition, the cationic and anionic components being present in a ratio about 0.6 to about 3 of cationic to anionic components.

55. The method of claim 39 wherein the rosin is present in an amount of about 10 wt % to about 60 wt %, the anionic component is present in an amount of about 0.1 wt % to about 2 wt % and the cationic component is present in an amount of about 0.1 wt % to about 5 wt %, all wt % being on a dry basis of the component in the composition, the cationic and anionic components being present in a ratio greater than about 0.1 of cationic to anionic components.

56. The method of claim 39 wherein the zeta potential is at least 25 millivolts.

57. The method of claim 39 wherein the zeta potential is at least 40 millivolts.

* * * * *